United States Patent [19]

Corey et al.

[11] 4,159,870

[45] Jul. 3, 1979

[54] EXPOSURE CONTROL APPARATUS INCLUDING GENERAL PURPOSE LAG COMPENSATION

[75] Inventors: George P. Corey; Paul Haas, Jr., both of Rochester, N.Y.

[73] Assignee: Eastman Kodak Company, Rochester, N.Y.

[21] Appl. No.: 879,525

[22] Filed: Feb. 21, 1978

[51] Int. Cl.$^2$ .......................... G03B 7/08; G03B 15/05
[52] U.S. Cl. ........................................ 354/32; 354/34; 354/51
[58] Field of Search .............................. 354/31, 32–34, 354/50, 51, 60 R, 60 F, 129, 145; 315/241 P, 151, 157, 38, 36, 29, 30

[56] References Cited

U.S. PATENT DOCUMENTS

| | | | |
|---|---|---|---|
| 3,200,723 | 8/1965 | Topaz | 354/34 |
| 3,519,879 | 7/1970 | Ogawa | 315/241 P X |
| 3,896,337 | 7/1975 | Decker | 315/241 P |
| 3,984,848 | 10/1976 | Akiyama et al. | 354/51 |
| 4,008,481 | 2/1977 | Whiteside | 354/32 |
| 4,019,092 | 4/1977 | Stiller | 315/159 |
| 4,033,682 | 5/1977 | Nakamura et al. | 354/51 X |
| 4,034,383 | 7/1977 | Mashimo et al. | 354/51 X |
| 4,057,811 | 11/1977 | Harrison | 354/33 |
| 4,058,818 | 11/1977 | Johnson et al. | 354/33 |
| 4,072,964 | 2/1978 | Pope et al. | 354/33 |

*Primary Examiner*—L. T. Hix
*Assistant Examiner*—William B. Perkey
*Attorney, Agent, or Firm*—Dennis P. Monteith

[57] ABSTRACT

An exposure control circuit of the type adapted to produce an exposure termination signal after a time interval related to a time integral of light intensity includes general purpose lag compensation responsive to the absolute change in light intensity from the beginning to the end of exposure measurement for adjusting the time interval, whereby lag compensation is provided in ambient, flash, or fill-flash modes without the need for external mode switches.

8 Claims, 9 Drawing Figures

EXPOSURE CONTROL TIMING DIAGRAM

EXPOSURE CONTROL APPARATUS INCLUDING GENERAL PURPOSE LAG COMPENSATION

BACKGROUND OF THE INVENTION

1. Field of the Invention

This invention relates to exposure control apparatus for photographic cameras and more particularly to such exposure control apparatus including lag compensation.

2. Discussion Relative to the Prior Art

Many photographic cameras have automatic exposure control systems that terminate an exposure in response to an exposure termination signal generated by a light integrating type exposure control circuit. The exposure may be terminated, for example, by quenching an electronic flash and/or by closing a shutter. In any event, a finite amount of time elapses from the time that the exposure control circuit generates the exposure termination signal to the time that the exposure is actually terminated. This elapsed time is commonly called the "lag time" and is caused by electrical and/or mechanical delays that may be minimized by efficient design of the exposure control system, but not entirely eliminated. The exposure that occurs during the lag time can be a substantial portion of the total exposure. Unless this exposure is effectively accounted for by the exposure control system, an appreciable exposure error may result. The lag problem is particularly troublesome for a photographic process that has a narrow "exposure latitude" such as the instant camera processes that are currently on the market.

One aspect of the lag problem is represented by a shutter closing delay when a picture is taken of a scene illuminated with ambient light, sometimes called an "ambient mode" exposure. In such a case, the shutter closing delay, or shutter lag as it is called, can be adequately compensated for by activating the exposure control circuit a predetermined time prior to the opening of the shutter. This predetermined time is commonly called the "lead time" and is usually chosen to be equal or nearly equal to the shutter lag time. Thus, during an exposure in the ambient mode, the light-responsive exposure control circuit "sees" a quantity of light, prior to the initiation of the actual exposure, that is equal or nearly equal to the quantity of light "seen" by the film during the lag time. Consequently, the lag may be effectively accounted for in the ambient mode by providing a corresponding lead.

If the scene illumination changes during the period of exposure, such as occurs when a scene is illuminated by a flash device, commonly called a "flash mode" exposure, the amount of light seen by the exposure control circuit during the lead time may differ significantly from the amount seen by the film during the lag time. As a result, an appreciable exposure error may result in the flash mode. Therefore, in addition to providing a lead time for ambient exposures, some additional or alternative lag compensation must be provided when a camera is operated in the flash mode. One approach derives the shutter lag compensation from scene brightness information in such a way that the timing of the exposure termination signal is advanced by an amount substantially equal to the lag time. In order to do this, the lag compensation scheme, in effect, continuously predicts when the exposure termination signal will be generated at a time in the future that takes into account the lag time, and then actually generates the exposure termination signal as soon as the prediction is affirmative. Such a system is disclosed in U.S. Pat. No. 3,200,723 for shutter lag compensation, and in U.S. Pat. No. 3,519,879 for electronic flash quench lag compensation. The disclosed systems both use a biasing resistor in the base leg of an R-C timing circuit to continuously bias the light-related charge on an integrating capacitor by an amount proportional to the instantaneous scene brightness. The value of the biasing resistor in relation to the capacitance of the integrating capacitor is chosen to provide the desired compensation. When this arrangement, as shown in U.S. Pat. No. 3,200,723, is used in a camera to compensate for shutter lag in the flash mode, an external mode switch is provided for disabling the effect of the biasing resistor when operating the camera in the ambient mode. Furthermore, successful operation of the system in the flash mode requires that there not be significant ambient illumination during the flash illumination since such ambient illumination would confuse the exposure control system and result in an exposure error. Frequently however, it is desirable to provide flash illumination when there is already significant ambient illumination; such operation of a photographic camera is called exposure in the "fill-flash" mode. The prior art flash compensation apparatus described above will not operate satisfactorily in the fill-flash mode; additionally, the mode switch required to switch between the ambient mode and the flash mode adds complexity and cost to the exposure control system.

For the reasons outlined above, the problem has been to provide an exposure control system with lag compensation that will operate in ambient, flash, and fill-flash modes without the requirement of external mode switches for transferring between the operational modes.

SUMMARY OF THE INVENTION

According to the present invention, the problem has been solved by providing an exposure control system, in a photographic camera, that includes a lag compensation circuit that is responsive to changes in measured light intensity during the exposure time for adjusting the exposure time interval, whereby the adjusted time interval results in substantially the desired exposure whether the exposure is made in the ambient, flash, or fill-flash modes.

More particularly, according to one embodiment of the present invention, a camera having a shutter that is opened to initiate exposure and is closed, in response to an exposure termination signal, to terminate exposure includes an exposure control circuit for measuring the intensity of scene light and producing the exposure termination signal as a function of the time integral of the measured light intensity. The exposure control circuit has a photometer for measuring the scene light and producing a photosignal in proportion thereto. The photometer starts measuring light prior to actual shutter opening by an interval substantially equal to the shutter lag time. The exposure control circuit produces a lag compensation signal that represents the time derivative of the photosignal multiplied by a predetermined constant. The lag compensation signal is added to the photosignal and the sum is integrated. The circuit includes a trigger that is responsive to the integrated sum to produce the exposure termination signal when the integrated sum represents the total required exposure. The effect of integrating the sum of the photosignal and its derivative is to bias the integrated photosignal by an amount proportional to the absolute change in light intensity from the start of measurement to the production of the exposure termination signal.

In an alternative embodiment, the derivative of the photosignal is not integrated; rather the value of the photosignal is sampled at the moment light measurement is commenced and this value, multiplied by a constant is subtracted from the integrated photosignal. The photosignal itself, multiplied by the constant is added to the remainder to directly provide a correction proportional to the absolute change in light intensity from the start of light measurement to the time that the exposure termination signal is generated.

The invention, and its advantages, will become more apparent in the detailed description of the preferred embodiments presented below.

BRIEF DESCRIPTION OF THE DRAWINGS

The invention will be further described with reference to the accompanying drawings wherein.

DETAILED DESCRIPTION OF THE EMBODIMENTS

Figure 1:
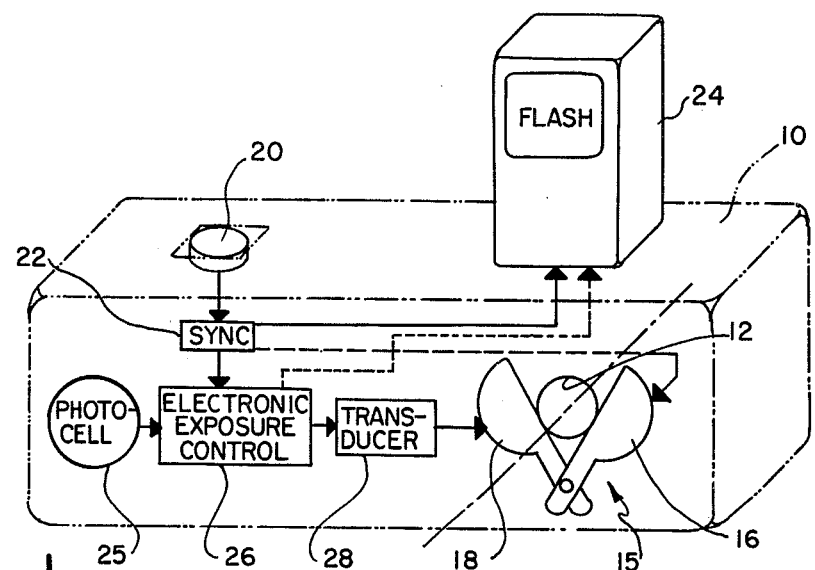
FIG. 1 is a schematic representation of a photographic camera having an exposure control system with the general purpose lag compensation of the present invention.

The invention will be described in connection with a photographic camera of the type including a shutter that is opened in response to operator actuation and is closed in response to a signal generated by a light integrating exposure control circuit. The camera may also include a flash illumination device of the chemical type, or of the electronic type possibly having a quenchable flash output. Such a camera, as schematically represented in FIG. 1, includes a camera body 10 and an exposure aperture 12 through which light passes to expose film (not shown). A shutter generally designated 15 controls the passage of light through aperture 12 and includes means for uncovering the aperture, to initiate an exposure, shown as an opening blade 16 and means for covering the aperture, to terminate an exposure, shown as a closing blade 18. Blade 16 is opened in response to operator actuation of a body release member 20 that is coupled to opening blade 16 through a mechanical or electrical synchronization means 22, the function of which will be further described below. A source of flash illumination 24 in a flash-receiving socket 24a located within the top surface of the camera, may comprise one of two general types—either a chemical flash or an electronic flash. The light output from a chemical flash illumination device is of relatively long duration compared to a typical shutter open time, whereas the light output from an electronic flash device is of relatively short duration compared to the duration of the chemical flash output. For convenience of description, the ensuing discussion will relate to chemical flash only, the relevance of the present invention to electronic flash will then be discussed below.

When the camera is operated in the flash or fill-flash mode, the flash unit 24 is triggered to produce a flash output in a timed relation with the shutter opening. The synchronization between flash ignition and shutter opening in response to operation of the body release 20 is controlled by the synchronization means 22. A photocell 25 which is adapted to receive scene light in proportion to the amount of light directed on the film, is associated with an electronic exposure control circuit 26 that monitors the total quantity of light received and produces a shutter close signal in response to a sufficient quantity being monitored. The initiation of measurement of scene light by the exposure control circuit is controlled by the synchronization means 22 in response to actuation of body release member 20. Thus, the exposure control circuit operates by solving for T an equation of the general form:

$$E = \int_0^T I(t)\, dt \qquad (1)$$

where:
E—is a predetermined constant representing the required exposure,
I(t)—is the light intensity as a function of time,
T—is the time required to achieve E.

Equation (1) is solved for T by producing the exposure termination signal when the equality is satisfied. The exposure termination signal controls the closing of shutter blade via electromechanical transducer 28.

Figure 2:
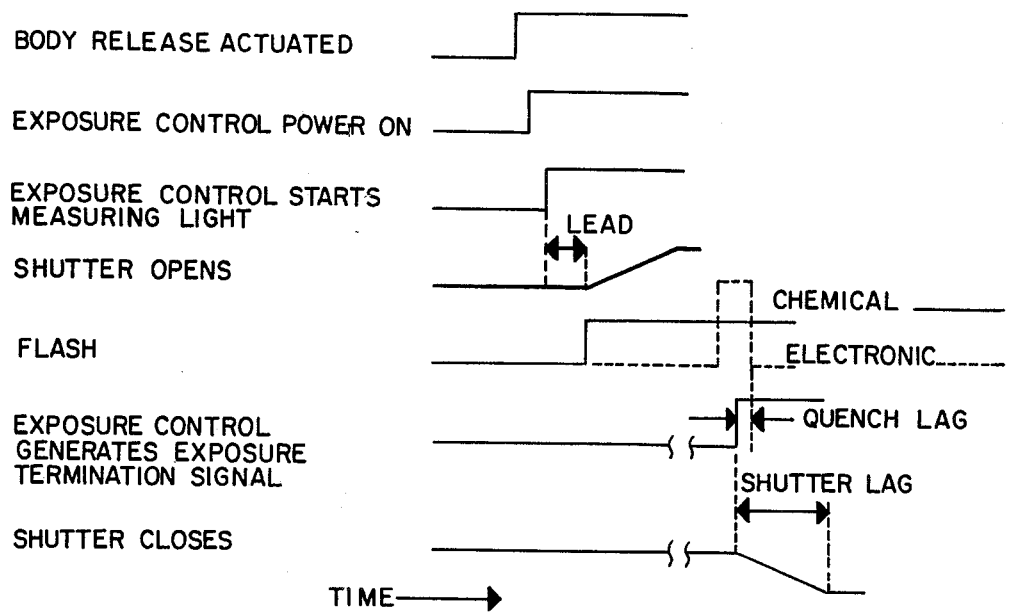
FIG. 2 is a timing diagram showing the operation of the camera of FIG. 1.

The operation of the photographic camera shown in FIG. 1 will now be described with reference to the timing diagram of FIG. 2. When the body release 20 is actuated, synchronization means 22 applies power to the exposure control circuit 26 so that it will be prepared to initiate light measurement when called for. Subsequently, the synchronization means 22 signals the exposure control circuit 26 to start measuring the scene light received by photocell 25. After the predetermined lead time, the synchronization means 22 causes opening blade 16 of shutter 15 to uncover aperture 12 to initiate exposure. In the flash mode or the fill-flash mode, synchronization means 22 provides a signal, shown diagrammatically in FIG. 1, at the flash-receiving socket 24a to trigger the flash illumination device 24 to produce a flash light output so that the flash illumination begins substantially simultaneously with the opening of shutter blade 16. When the electronic exposure control circuit has measured a sufficient total amount of light for proper exposure, it will generate an exposure termination signal, in this case the shutter close signal. The time from he generation of the shutter close signal to the actual shutter closing is the shutter lag time.

Figure 3:
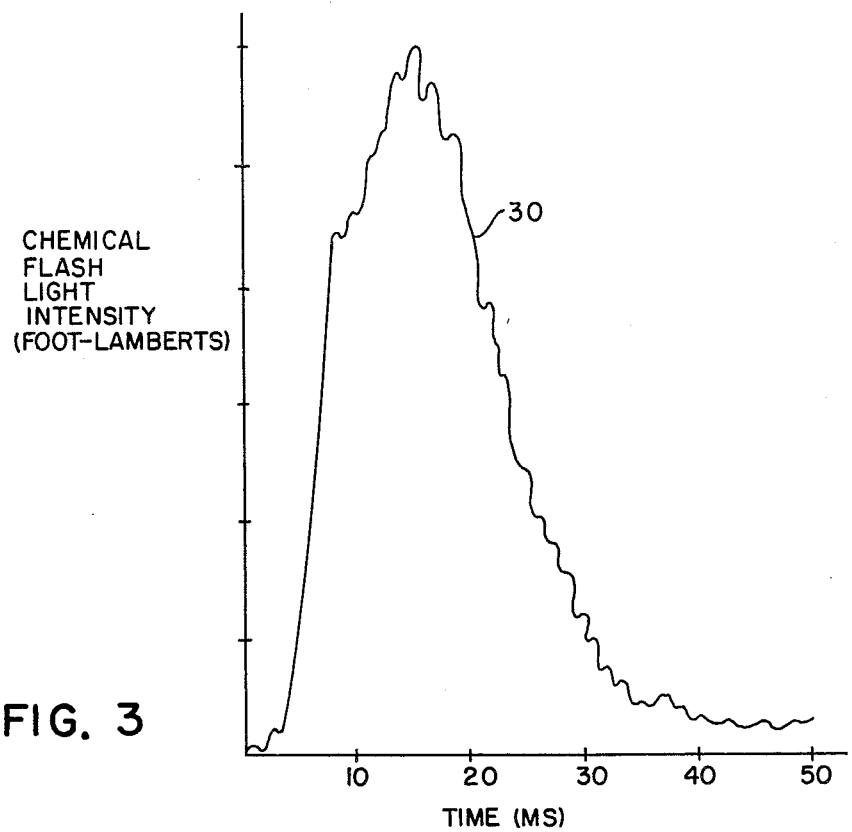
FIG. 3 is a plot of light output intensity versus time for a typical chemical flash illumination device.
Figure 4:
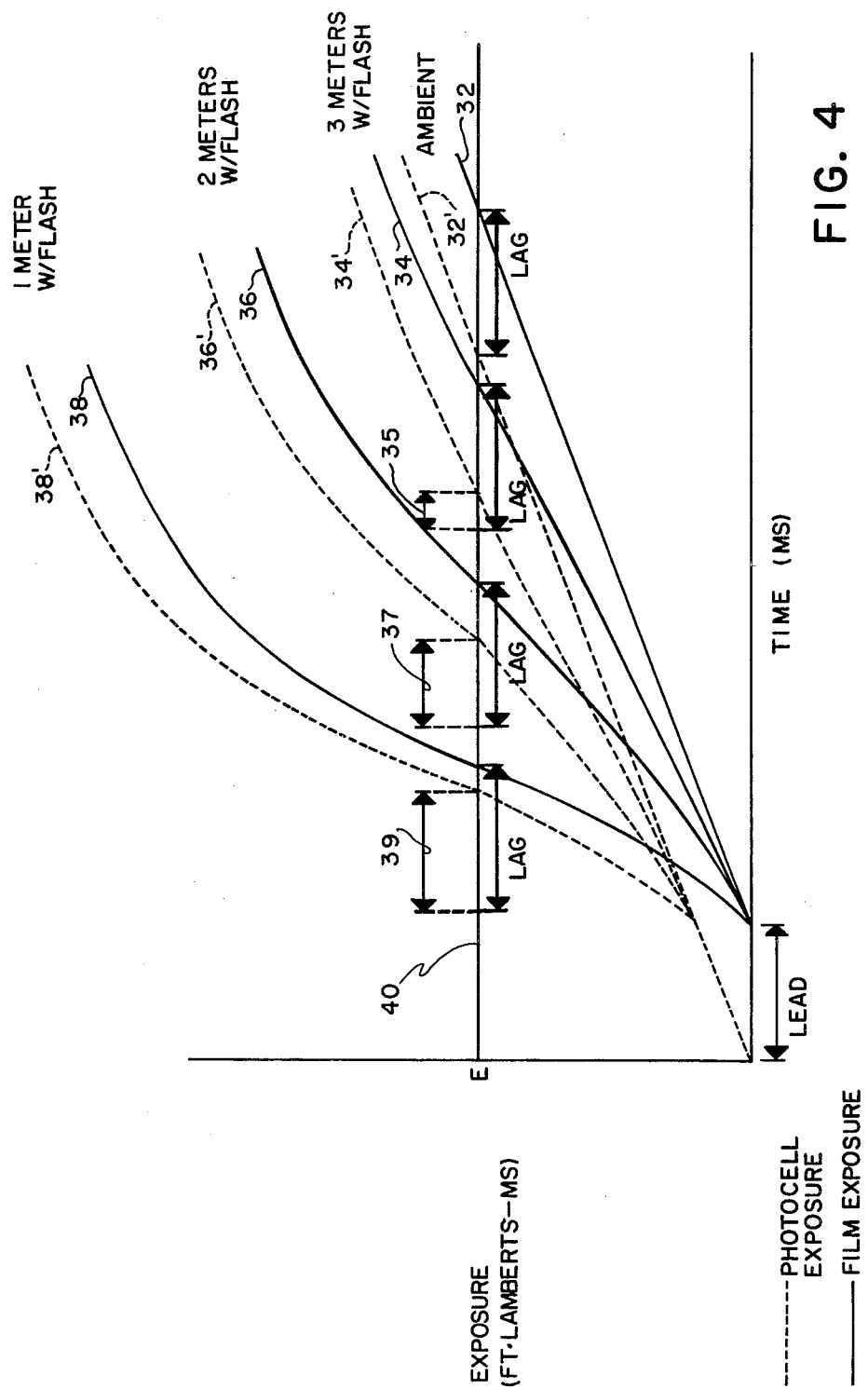
FIG. 4 is an idealized plot of exposure versus time for the film and the photocell of the camera shown in FIG. 1 in the ambient mode and in the fill-flash mode for several subject distances.

FIG. 3 is a plot of light output intensity versus time for a typical chemical flash illuminating device. As can be seen in FIG. 3, the flash intensity as shown by line 30 varies continuously with time in milliseconds. The amount of flash light reflected from the scene to the camera is strongly dependent on the distance from the flash illumination source to the subject and the distance from the subject to the camera. The time rate of exposure will vary depending on the subject distance. FIG. 4 graphically illustrates this variation by plotting the exposure versus time in milliseconds for the film (solid lines) and for the exposure control system (dashed lines) for a typical ambient exposure and three fill-flash exposures with the same ambient background at three different subject distances. The ambient film and photocell exposures are represented by lines 32 and 32', respectively. The three fill-flash exposures at three meters, two meters, and one meter are represented by lines 34 and 34', 36 and 36', and 38 and 38', respectively. Line 40 represents the total exposure (E) required for the particular film being exposed. As shown in FIG. 4, in the ambient mode, the photocell exposure 32' reaches the required total exposure E exactly one lag time prior to the time when the film exposure curve 32 reaches the required exposure level. Consequently, a proper exposure is obtained.

For the flash exposure taken at three meters, the photocell curve 34' reaches the required exposure level E at a time somewhat less than one lag time prior to the time when the film exposure curve 34 reaches the required total exposure. This difference, indicated by line segment 35, represents the amount of lag compensation that should be provided by the exposure control circut to obtain a proper exposure. Similarly, the photocell curve 36', representing the flash exposure at a subject distance of two meters, leads the film exposure curve 36 even less than the exposure at three meters. The required correction for the exposure at two meters, as indicated by line segment 37, is greater than the correction required at three meters. For the flash exposure taken at one meter from the subject, the required correction is even greater, as indicated by line segment 39. Thus, as is apparent from FIG. 4, some extra correction must be included in the exposure control equation to yield a proper exposure when flash illumination is employed. With the addition of this extra term, the exposure control equation may take the general form:

$$E = \int_0^T [I(t) + X] dt \qquad (2)$$

where:

X—is the correction to be applied.

Apparatus constituting the present invention resulted from the discovery, by the inventors, that a good flash compensation may be achieved if the correction term X in the exposure equation is a function of the time derivative of the light intensity I(t). This results, when the correction is integrated, in a correction that is a function of the absolute change in light intensity from time O to time T. It will be seen that the derivative of the light level has the desired properties for a corrector since, under ambient illumination conditions, the function I(t) is a constant and its first derivative with respect to time will therefore be zero and hence make no contribution to the exposure control equation in the ambient mode.

Therefore, according to the invention, the corrector X is chosen to be CdI(t)/dt where C is an empirically chosen constant selected to provide optimum results. According to the invention, the lag compensation works in ambient, flash, and fill-flash modes without the need for external mode switches.

The exposure equation according to the invention then becomes:

$$E = \int_0^T [I(t) + C\frac{dI(t)}{dt}] dt \qquad (3)$$

where:

C is a predetermined constant.

Figure 5:
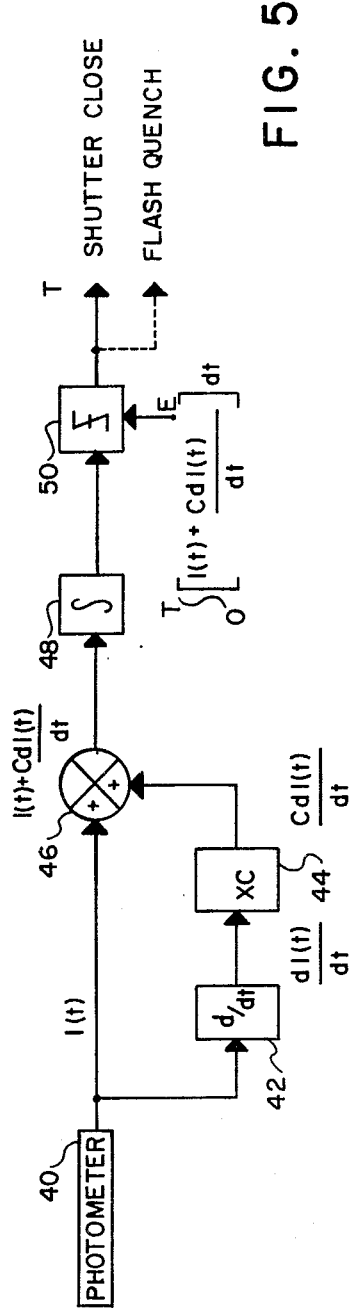
FIG. 5 is a signal flow diagram for an exposure control circuit including lag compensation according to one embodiment of the present invention.

FIG. 5 shows a signal flow chart for an exposure control system, according to the present invention, that solves equation (3) for T. In the exposure control system shown, a photometer 41 which is activated at the time zero produces a photosignal I(t) that is proportional to the quantity of light incident thereon. The time derivative of the photosignal dI(t)/dt is taken in a differentiating circuit 42 and the derivative is multiplied by constant C in a multiplier 44. The signal representing the product from the multiplier 44 is added to the original photosignal in a summer 46 and a signal representing the sum is integrated by an integrator 48. The output of the integrator is applied to the switching input of a level sensitive switch such as a trigger circuit 50 that produces an output when the input signal exceeds a predetermined level E representing the total exposure required. The output from the trigger circuit 50 will occur at time T and comprises the exposure termination signal.

Figure 6:
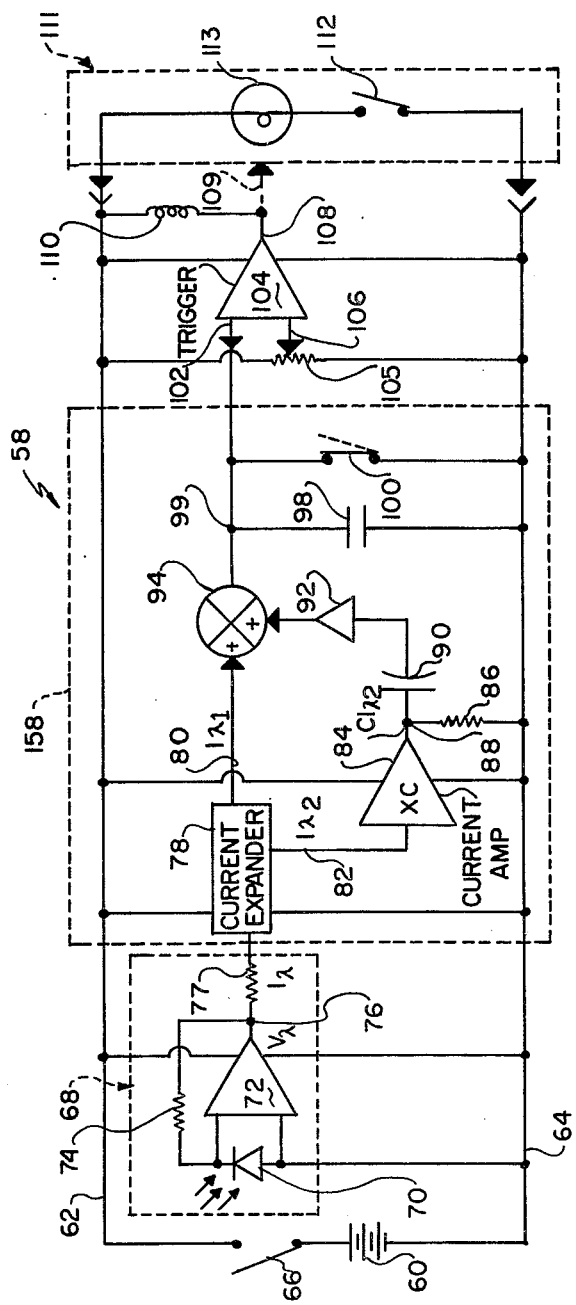
FIG. 6 is a schematic circuit diagram of an exposure control circuit implementing the signal flow diagram of FIG. 5.

A schematic diagram of an exposure control circuit embodying the signal flow according to the present invention is shown in FIG. 6. The exposure control circuit, generally designated 58, is powered by a battery 60 that is connected between a power buss 62 and a return line 64. A main power switch 66, connected in series with battery 60, can be closed to activate the circuit prior to exposure control. The exposure control circuit includes a photometer generally designated 68 having, for example, a photodiode 70 connected across the inputs of an operational amplifier 72. A feedback resistor 74 is connected between an output 76 of the operational amplifier 72 and the cathode of diode 70 so that a voltage V$\lambda$ representing the intensity of light impinging on the photodiode, is produced at the output 76 of the amplifier 72. A series resistor 77 converts the voltage V$\lambda$ to a proportional photocurrent I$\lambda$. A current expander 78 receives photocurrent I$\lambda$, and supplies two identical currents I$\lambda_1$ and I$\lambda_2$, proportional to I$\lambda$, at its outputs 80 and 82, respectively. I$\lambda_2$ is supplied to a current amplifier 84 that multiplies the current I$\lambda_2$ by a constant C. The resulting current CI$\lambda_2$ is sensed by a resistor 86 connected between an output 88 of the current amplifier and the return line 64, thereby producing a voltage proportional to CI$\lambda_2$ on line 88. Changes in the photocurrent CI$\lambda_2$ are transferred across a series connected capacitor 90 that functions as a differentiator. The output of capacitor 90 is connected to the input of a buffer 92, the output of which is connected to a summer 94 that serves to sum the photocurrent I$\lambda_1$ with the output of buffer 92 to produce a corrected photocurrent (I$\lambda$+CdI$\lambda$)/dt.

An integrating capacitor 98 is connected between the summer 94 and the return line 64. The integrating capacitor produces a voltage on line 99 proportional to the time integral of the current $I\lambda + CdI\lambda/dt$. A normally closed initialization switch 100 is connected in parallel with integrating capacitor 98 and serves, when opened, to initiate integration on capacitor 98. Line 99 is connected to the switching input 102 of a level sensitive trigger circuit 104. A reference voltage divider 105 is connected across lines 62 and 64 and generates a reference voltage that is applied to a reference input 106 of trigger circuit 104. Trigger circuit 104 includes an output 108 that is normally held at a low voltage. When the voltage at the switching input 102 exceeds the voltage at the reference input 106, trigger circuit 104 supplies a high voltage at its output 108.

An electromechanical transducer, shown as a solenoid 110, is connected between lines 62 and the output 108 of trigger circuit 104. When the output of trigger circuit 104 is low, a current will flow through solenoid 110 to energize it, and conversely when the output of trigger circuit is high, current will cease to flow through solenoid 110 to thereby de-energize it.

A flash illumination device generally designated 111 includes a flash lamp 113 and a flash ignition switch 112 which are connected in series between lines 62 and 64.

The exposure control circuit 58 shown in FIG. 6 functions in a camera of the type shown in FIG. 1 in the following manner. When the body release member 20 is depressed, synchronization means 22 closes switch 66 to power the exposure control circuit. Scene light impinging on the photodiode 70 generates a photocurrent $I\lambda$ proportional to the light intensity. The photocurrent $I\lambda_2$ mirrored by the current expander 78 is amplified in current amplifier 84 by a constant C and sensed by resistor 86 to produce a voltage proportional to the photocurrent times C. Changes in the photocurrent are transmitted across differentiating capacitor 90. The differentiated product is added to the original photocurrent $I\lambda_1$ at summing node 92. Initially, switch 100 is closed, thereby shorting integrating capacitor 98 and holding the voltage on line 99 near zero. Since, at this point, the voltage on trigger input 102 is lower than that applied to reference input 106 of trigger circuit 104, the trigger circuit will supply a low voltage at its output 108, and current will flow through solenoid 110 which thereby serves to hold the closing shutter blade 18 open.

Switch 100 is opened, to initiate the exposure timing sequence, by synchronization means 22. As capacitor 98 is charged by the photocurrent from summer 94, the voltage applied to switching input 102 rises with time as a function of the integral of $I(t) + CdI(t)/dt$. After a time corresponding to the lead time, synchronization means 22 causes shutter 15 to open and the exposure of the film begins. If the exposure is in a flash mode, synchronization means 22 closes switch 112 to ignite flash lamp 113 so that flash illumination commences substantially simultaneously with the opening of the shutter. When the voltage at switching input 102 equals the voltage at the reference input 106 of trigger circuit 104, the trigger circuit produces a high voltage at its output 108 thereby stopping the flow of current through solenoid 110 to release closing shutter blade 18 and terminate the exposure. After a delay inherent in the solenoid mechanism and the shutter construction, shutter blade 18 moves to cover aperture 12 and the film exposure is thereby terminated.

When an exposure is made in the ambient mode, contribution of the term $CdI(t)/dt$ is zero and and the circuit performs as if no lag correction other than the built-in lead had taken place. If the scene light intensity varies during exposure, such as the case when a flash is used to illuminate the scene, the term $CdI(t)/dt$ provides a lag compensation that is proportional to the change in light level during the exposure. Thus the present invention provides lag compensation for all lighting conditions without the need for external mode switching.

Figure 7:
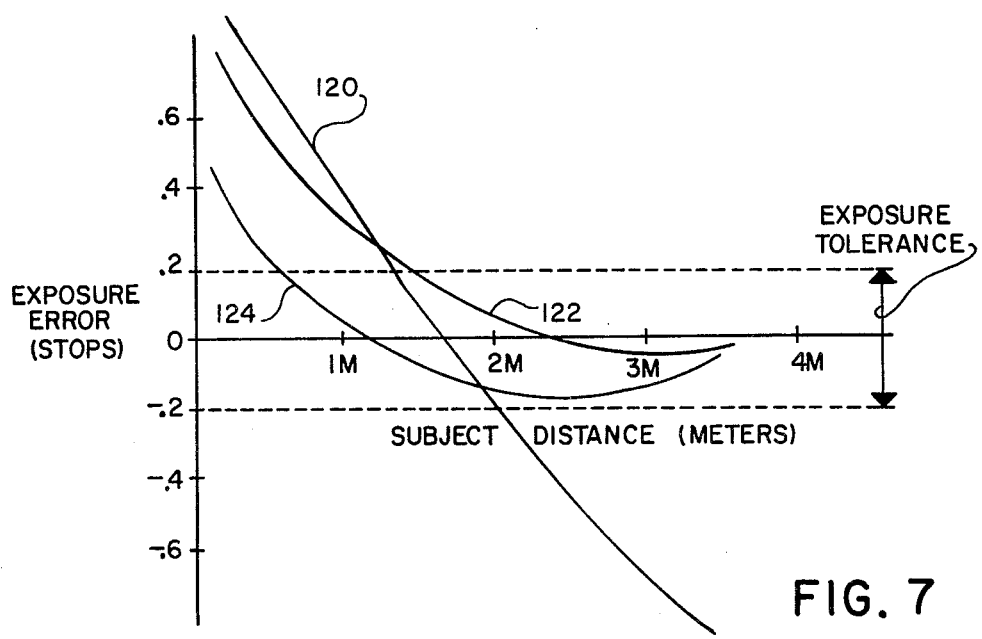
FIG. 7 is a graph showing relative exposure error versus distance for flash photography without lag compensation and with lag compensation according to the present invention.

In a typical embodiment of the exposure control system described above, the shutter lag time is three and one-half milliseconds and the lead time is chosen to be substantially equal to the lag time. FIG. 7 graphically illustrates the exposure error versus subject distance resulting from three different values of the constant C in such a system. An exposure tolerance of plus or minus 0.2 stops of exposure is indicated by the dotted lines. Curve 120 shows the performance of the system when C is set to zero, i.e., when the correction is disabled. Curves 122 and 124 illustrate the performance of the system when two different positive values of C are chosen. The best performance observed, represented by curve 124, resulted when the value of constant C was chosen to be $4.5 \times 10^{-3}$ for chemical flash illumination.

When the flash illumination means 24, shown in FIG. 1, comprises an electronic flash unit, the duration of the flash light output pulse is relatively short with respect to the shutter-open time. There is still, however, a time lag between the time that a flash quench pulse is generated by the exposure control circuit and the actual termination of flash illumination. This time lag will be much smaller than the shutter time lag but since the light intensities during the electronic flash pulse are very high, the total exposure occurring during the lag will be appreciable. Since the time derivative of light intensity $dI(t)/dt$ is much larger when a scene is illuminated by electronic flash, the constant C in the exposure control equation will be proportionally smaller to yield a proper correction. With this change in the constant C, the exposure control system, according to the present invention, will perform just as well for electronic flash illumination as for chemical flash illumination. In the electronic exposure control circuit shown in FIG. 6, the shutter-close signal that is generated by the exposure control electronics at the output 108 of trigger 104 is also employed as a flash-quench signal shown as dotted line 109. Since the shutter lag time is appreciably greater than the flash-quench lag time, the flash will quench before the shutter actually begins to close. If there is an appreciable level of ambient light, an additional exposure will occur during the shutter lag time. However, this additional exposure will have been adequately accounted for by the exposure control circuit during the "lead time." In this case, i.e., electronic flash illumination, the "lead time" is still set substantially equal to the shutter lag time, but the constant C will be a substantially smaller value than in a case with chemical flash.

It will be noted that the second term of equation (3) may be integrated to yield:

$$E = \int_0^T I(t)\,dt + CI(T) - CI(O) \qquad (4)$$

where:

I(T)—is the measured light intensity at time T;
I(O)—is the measured light intensity at the instant the exposure control system starts to measure light.

Figure 8:
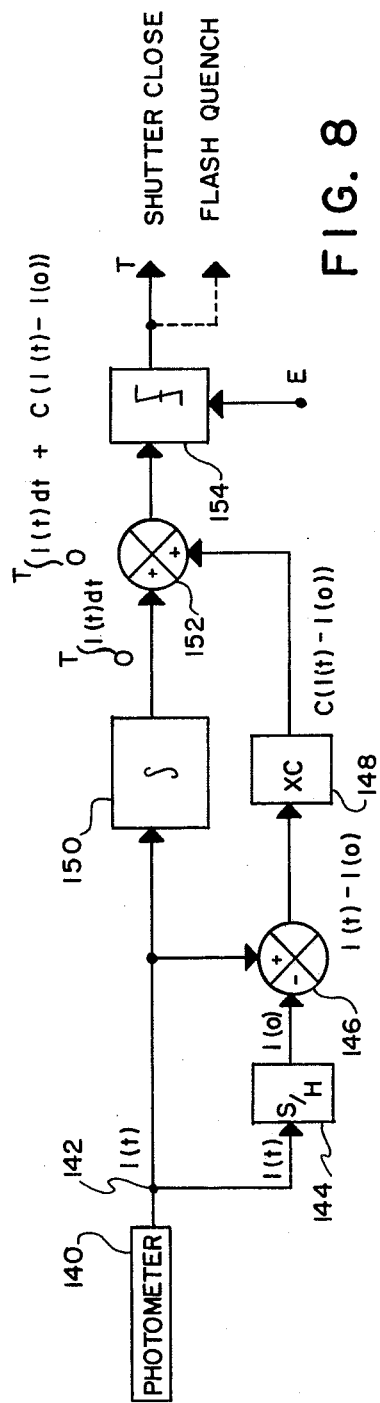
FIG. 8 is a signal flow diagram for an exposure control circuit including lag compensation according to an alternative embodiment of the present invention.

An alternative embodiment of the present invention solves equation (4) for T to control exposure and compensate for lag. A signal flow chart for a circuit that solves equation (4) for T is shown in FIG. 8. According to the alternative embodiment of the present invention, photometer 140 measures the intensity of light from the scene and produces a photosignal I(t) at its output 142. The photosignal is sampled at time zero by a sample and hold circuit 144. The photosignal sample I(0) is subtracted from the photosignal I(t) by circuit 146 and the remainder is multiplied by a constant c in a multiplier 148 to produce the flash-correction component C(I(t)-I(O)). The photosignal I(t) is also integrated by integrator circuit 150. The integrated photosignal and the product from multiplier 148 are summed by a summing circuit 152. The sum, representing the corrected integrated photosignal, is supplied to a trigger circuit 154 that generates a shutter-close signal and/or flashquench signal when the sum from summing circuit 152 reaches the predetermined trigger level E representing the required exposure.

Figure 9:
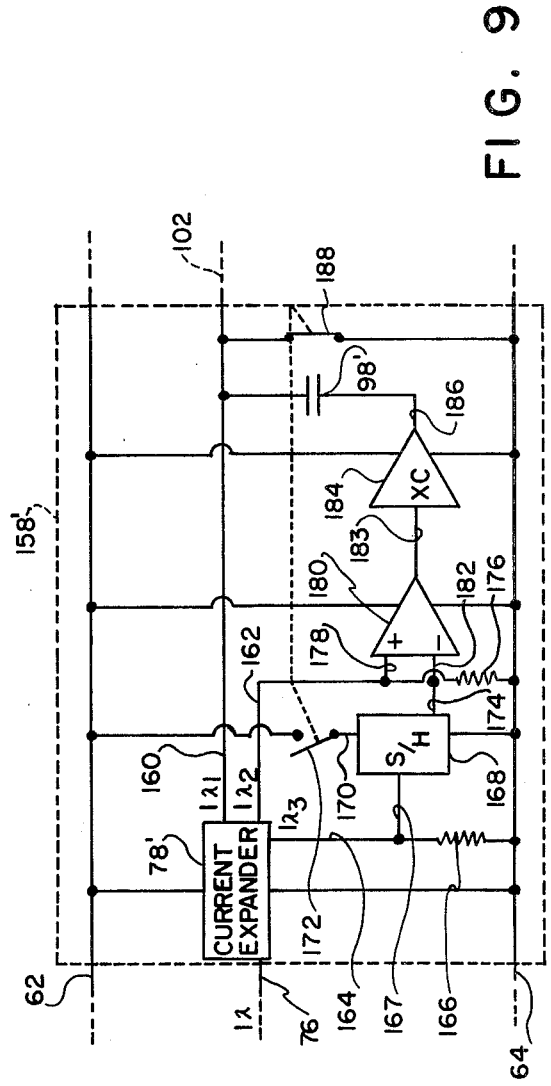
FIG. 9 is a schematic circuit diagram of a modification to a portion of the circuit shown in FIG. 6 for implementing the signal flow diagrammed in FIG. 8.

The exposure control circuit shown in FIG. 6 may be modified to implement the signal flow shown in FIG. 8 by replacing the portion of the circuit designated 158 with the circuit portion generally designated 158' and shown in FIG. 9. The circuit portion shown in FIG. 9 includes a current expander 78' that receives the photocurrent Iλ on line 76 and mirrors this current on three output lines 160, 162 and 164, at Iλ$_1$, Iλ$_2$, and Iλ$_3$, respectively. A resistor 166, connected between line 164 and return line 64 senses photocurrent Iλ$_3$ producing a proportional voltage on line 164. The voltage is applied to an input 167 of a sample and hold circuit 168 that includes a clocking input 170. The clocking pulse for the sample and hold circuit is generated by momentarily closing the normally open switch 172 connected between power line 62 and clocking input 170. When a clocking pulse is applied to the sample and hold circuit the voltage on line 164 representing the intensity of light at time zero is detected and held on an output 174 of sample and hold circuit 168.

A sampling resistor 176 connected between line 162 and return line 64 senses photocurrent Iλ$_2$ thereby producing a proportional voltage on line 162. The voltage is applied to a positive input 178 of a differencing amplifier 180. The output of sample and hold circuit 168 is applied to a negative input 182 of differencing amplifier 180. Differencing amplifier 180 produces at its output 183 a voltage representing the difference between the instantaneous value of Iλ$_2$ and the sampled value of Iλ$_3$ at time zero. Output 183 supplies the difference voltage to the input of an amplifier 184 that multiplies the difference by a constant C and produces a voltage at its output 186 representing the product. Output 186 is connected to one plate of an integrating capacitor 98' to thereby bias any accumulated photocharge on the capacitor by an amount proportional to the instantaneous light intensity minus the light intensity at time zero, multiplied by a constant C. The other plate of integrating capacitor 98' is connected to line 160 and is thereby supplied with photocurrent Iλ$_1$.

A normally closed initialization switch 188 is connected between line 160 and return line 64 so that photocurrent Iλ$_1$ will not be integrated by capacitor 98' until switch 188 is opened. Switch 188 is synchronized with switch 172 so that when switch 188 is opened to initiate exposure control, switch 172 is closed to sample the intensity of scene light.

With the substitution of circuit portion 158' for circuit portion 158 in FIG. 6, the overall operation of the exposure control system will be substantially the same, i.e., the exposure control system will compensate for lag as a function of the absolute change in light intensity from the beginning of exposure measurement to the generation of the exposure termination signal under any scene lighting conditions without the use of external mode switches.

The invention has been described in detail with reference to the Figures; however, it will be appreciated that variations and modifications are possible which are within the spirit and scope of the invention. For example, in the alternative embodiment of the present invention as diagrammed in FIG. 8, the correction signal C(I(T)−I(O)) could be used to bias the trigger level of trigger circuit 154 rather than being added to the integrated photosignal by summing circuit 152.

What is claimed is:

1. In a photographic camera adapted to expose a photosensitive recording medium to scene light whose intensity either substantially varies or remains substantially constant during the exposure, improved exposure control apparatus comprising:
    (a) means for initiating exposure of the photosensitive medium;
    (b) means for receiving photoflash apparatus;
    (c) means coupled to said photoflash apparatus receiving means and said exposure initiating means for operating received photoflash apparatus to produce light of substantially varying intensity in timed relation to operation of said exposure initiating means;
    (d) means responsive to an exposure termination signal for terminating the exposure;
    (e) light-responsive timing means, coupled to said exposure terminating means, adapted when actuated for generating a photosignal proportional to scene light and for generating the exposure termination signal a time interval after being actuated, the time interval being related to the time integral of said photosignal, and thereby to the time integral of said scene light, said exposure terminating means exhibiting a characteristic time delay between the generation of the exposure termination signal and actual termination of the exposure;
    (f) first means, coupled to said light-responsive timing means, for compensating for the characteristic time delay including means for actuating said timing means a predetermined time prior to initiation of exposure; and
    (g) second means, coupled to said light-responsive timing means, for compensating for the characteristic time delay, said second means, operating independently of whether photofalsh apparatus is utilized to effect the exposure, for adjusting the time interval in proportion to the time rate of change of said photosignal from the beginning to the end of the time interval, and thereby to the time rate of change of said scene light from the beginning to the end of the time interval,
whereby the adjusted time interval results in substantially the desired exposure whether the intensity of the scene light is substantially constant or is substantially varying during the time interval.

2. In a photographic camera having means for initiating an exposure and means responsive to an exposure termination signal for terminating exposure, an exposure control apparatus for generating the exposure termination signal, comprising:
  (a) means responsive to scene light for producing a photosignal representative of the intensity thereof;
  (b) means responsive to said photosignal for producing a lag compensation signal representative of the product of the time derivative of said photosignal and a predetermined constant;
  (c) means responsive to said photosignal and said lag compensation signal for producing a corrected photosignal representing the sum thereof;
  (d) means responsive to said corrected photosignal for producing an integrated corrected photosignal representative of the time integral of said corrected photosignal;
  (e) means for producing a reference signal representative of a predetermined total exposure; and
  (f) means responsive to said integrated corrected photosignal and said reference signal for producing the exposure termination signal when said integrated corrected photosignal represents said predetermined total exposure, whereby exposure is controlled in ambient, flash, or fill-flash modes without the need for mode switches.

3. In a photographic camera having means for initiating an exposure and means responsive to an exposure termination signal for terminating the exposure, an exposure control apparatus for generating the exposure termination signal, comprising:
  (a) means responsive to scene light for producing a photosignal representative of the intensity thereof;
  (b) means for producing an initial signal representative of the intensity of scene light at a predetermined time prior to the initiation of exposure;
  (c) means responsive to said photosignal and said initial signal for producing a correction signal representative of their difference multiplied by a predetermined constant;
  (d) means responsive to said photosignal for producing an integrated photosignal representing the time integral thereof;
  (e) means responsive to said integrated photosignal and said correction signal for producing a corrected integrated photosignal representing the sum thereof;
  (f) means for generating a reference signal representing a predetermined total exposure; and
  (g) means responsive to said reference signal and said corrected integrated photosignal for producing the exposure termination signal when said corrected integrated photosignal represents said predetermined total exposure,
whereby exposure is controlled in ambient, flash, or fill-flash modes without the need for mode switches.

4. In a photographic camera adapted to receive and to operate photoflash apparatus and to photograph scenes illuminated by available light of substantially constant intensity, by photoflash light of substantially varying intensity, or by a combination of both, improved exposure control apparatus comprising:
  (a) a shutter actuatable to effectively uncover and cover an exposure aperture to initiate and terminate an exposure, said shutter having a characteristic delay between actuation to terminate the exposure and actual termination of the exposure;
  (b) light-responsive timing means actuatable for establishing a light-related time interval, the light-related time interval corresponding to that amount of time between initiation and termination of exposure that results in a desired predetermined amount of light passing through the aperture;
  (c) means, coupled to said light-responsive timing means and said shutter, (1) for actuating said shutter to initiate the exposure, and (2) for actuating said light-responsive timing means for initiating a light-related time interval an amount of time prior to initiation of exposure, which last mentioned amount of time is substantially equal to the characteristic delay;
  (d) means, coupled to said shutter and to said light-responsive timing means, for actuating said shutter to terminate an exposure in response to the end of the time interval; and
  (e) compensating means, associated with said light-responsive timing means and operable independently of whether photoflash apparatus is employed to illuminate the scene being photographed, for adjusting said time interval in proportion to the time rate of change in light intensity from the time of initiation of said time interval to the end of said time interval,
whereby said adjusted time interval results in substantially the desired amount of light passing through the aperture whether the light is of substantially constant intensity or of substantially changing intensity.

5. A photographic camera as claimed in claim 4, wherein: said light-responsive timing means includes means responsive to light for generating a photosignal representing light intensity, integrating means responsive to said photosignal for generating a signal representing the time integral of said photosignal, and means responsive to said time integral of said photosignal for ending said light-relates time interval when said time integral signal equals a predetermined value, and wherein said means responsive to change in light intensity includes means responsive to said photosignal for producing a compensation signal representing the time derivative of said photosignal multiplied by a predetermined constant, and means for summing said compensation signal and said photosignal for producing a modified photosignal to be supplied to said integrating means.

6. A photographic camera as claimed in claim 5, wherein: the characteristic delay is approximately 3.5 milliseconds and wherein said predetermined constant is approximately $4.5 \times 10^{-3}$.

7. A photographic camera claimed in claim 4, wherein: said light-responsive timing means includes means responsive to light for generating a photosignal representing light intensity, integrating means responsive to said photosignal for generating a signal representing the time integral of said photosignal, and means responsive to said time integral of said photosignal for ending said light-related time interval when said integrated photosignal equals a predetermined value, and wherein said means responsive to change in light intensity comprises means for sampling said photosignal at the moment of initiation of said time interval and supplying a sampled signal representing the value of said photosignal at that time, means responsive to said sampled signal and said photosignal for subtracting said sampled signal from said photosignal and providing a correction signal representing the difference multiplied by a predetermined constant, and means for adding said correction signal to said integrated photosignal.

8. In an exposure control apparatus of the type adapted to solve, for T, a general exposure equation:

$$E = \int_O^T I(t)\, dt$$

where:
- E is a constant representing the desired exposure;
- I(t) is light intensity as a function of time;
- T is the time required to achieve E; and
- O is the time the measurement of light intensity commences, the improvement comprising:
means, responsive to a change in light intensity from time O to time T, for compensating for a time delay of said exposure control apparatus between time T and actual termination of an exposure, said time delay compensating means being characterized as solving for T the equation:

$$E = \int_O^T [I(t) + C\frac{dI(t)}{dt}]\, dt,$$

where:
- C is a predetermined constant, whereby compensation for said time delay is provided to control exposure in ambient, flash, or fill-flash modes without the need for external mode switches.

* * * * *